US009047766B2

(12) United States Patent
Tuukkanen et al.

(10) Patent No.: US 9,047,766 B2
(45) Date of Patent: Jun. 2, 2015

(54) METHOD AND APPARATUS FOR NOTIFYING DRIVERS OF SPACE REQUIRED FOR OTHER VEHICLES

(71) Applicant: Nokia Corporation, Espoo (FI)

(72) Inventors: Marko Tuukkanen, Schlenzer (DE); Jerome Beaurepaire, Berlin (DE)

(73) Assignee: HERE GLOBAL B.V., Veldhoven (NL)

( * ) Notice: Subject to any disclaimer, the term of this patent is extended or adjusted under 35 U.S.C. 154(b) by 116 days.

(21) Appl. No.: 13/859,257

(22) Filed: Apr. 9, 2013

(65) Prior Publication Data

US 2014/0303880 A1 Oct. 9, 2014

(51) Int. Cl.

| | |
|---|---|
| ***G06F 19/00*** | (2011.01) |
| ***G06G 7/70*** | (2006.01) |
| ***G06G 7/76*** | (2006.01) |
| ***G08G 1/00*** | (2006.01) |
| ***G08G 1/01*** | (2006.01) |
| ***G08G 1/0967*** | (2006.01) |
| ***H04W 4/04*** | (2009.01) |

(52) U.S. Cl.

CPC ............ *G08G 1/0112* (2013.01); *G08G 1/0129* (2013.01); *G08G 1/0141* (2013.01); *G08G 1/096716* (2013.01); *G08G 1/096741* (2013.01); *G08G 1/096775* (2013.01); *H04W 4/046* (2013.01)

(58) Field of Classification Search

CPC .......... B60W 2550/402; B60W 50/14; B60W 2550/20; G08G 1/0112; G08G 1/0129; G08G 1/0141; G08G 1/096716; G08G 1/096741; G08G 1/096775; H04W 4/046

USPC .......................................................... 701/117

See application file for complete search history.

(56) References Cited

U.S. PATENT DOCUMENTS

| | | | | |
|---|---|---|---|---|
| 3,533,062 | A * | 10/1970 | Coffman | 340/907 |
| 5,278,554 | A * | 1/1994 | Marton | 340/910 |
| 8,296,030 | B2 | 10/2012 | Luo et al. | |
| 2004/0030587 | A1* | 2/2004 | Danico et al. | 705/4 |
| 2004/0083035 | A1* | 4/2004 | Ellis | 701/1 |
| 2004/0128062 | A1* | 7/2004 | Ogino et al. | 701/200 |
| 2006/0176847 | A1* | 8/2006 | Chen et al. | 370/328 |
| 2007/0030212 | A1* | 2/2007 | Shibata | 345/9 |
| 2007/0069920 | A1* | 3/2007 | Hakki et al. | 340/907 |
| 2007/0115868 | A1* | 5/2007 | Chen et al. | 370/315 |

(Continued)

FOREIGN PATENT DOCUMENTS

| | | |
|---|---|---|
| WO | 00/46775 A1 | 8/2000 |
| WO | 2011/019445 A1 | 2/2011 |

*Primary Examiner* — Mary Cheung
*Assistant Examiner* — Frederick Brushaber
(74) *Attorney, Agent, or Firm* — Ditthavong & Steiner, P.C.

(57) ABSTRACT

An approach is provided notifying a user while he or she is driving of an unmapped crossing to prevent the user from unintentionally obstructing access to the crossing. A traffic platform processes and/or facilitates a processing of traffic information associated with at least one crossing to determine one or more traffic conditions. The traffic platform determines that the one or more traffic conditions may at least potentially cause at least one obstruction of at least one other crossing by at least one vehicle. The traffic platform further causes, at least in part, a presentation of at least one notification regarding the at least one obstruction to at least one device associated with the at least one vehicle, at least one other vehicle that is potentially affected by the at least one obstruction, or a combination thereof based, at least in part, on the one or more traffic conditions.

20 Claims, 11 Drawing Sheets

100
119
TRAFFIC PLATFORM 103
RECOMMENDATION DATABASE 111
USER EQUIPMENT (UE) 101a
APPLICATIONS 107a-m
SENSORS 109a-m
COMMUNICATION NETWORK 105
SERVICES PLATFORM 113
SERVICE 115a
SERVICE 115n
USER EQUIPMENT (UE) 101m
APPLICATIONS 107a-m
SENSORS 109a-m
CONTENT PROVIDER 117a
CONTENT PROVIDER 117p

(56) References Cited

U.S. PATENT DOCUMENTS

2007/0230800 A1* 10/2007 Miyahara .................... 382/224
2008/0095134 A1* 4/2008 Chen et al. .................... 370/342
2008/0095163 A1* 4/2008 Chen et al. .................... 370/392
2008/0172171 A1* 7/2008 Kowalski .................... 701/118
2009/0256911 A1* 10/2009 Hakki et al. .................... 348/149
2009/0319095 A1* 12/2009 Cech et al. .................... 701/1
2011/0087433 A1* 4/2011 Yester .................... 701/301
2012/0179518 A1* 7/2012 Jaipaul .................... 705/14.4
2012/0188098 A1* 7/2012 Mochizuki .................... 340/905
2012/0209510 A1* 8/2012 Ikawa et al. .................... 701/423
2012/0274481 A1 11/2012 Ginsberg et al.
2014/0210646 A1* 7/2014 Subramanya .................... 340/928

* cited by examiner 100
119
TRAFFIC PLATFORM
103
RECOMMENDATION
DATABASE 111
COMMUNICATION
NETWORK 105
SERVICES PLATFORM 113
SERVICE 115a
SERVICE 115n
CONTENT PROVIDER
117a
CONTENT PROVIDER 117p
USER EQUIPMENT (UE)
101a
APPLICATIONS
107a-m
SENSORS
109a-m
USER EQUIPMENT (UE)
101m
APPLICATIONS
107a-m
SENSORS
109a-m

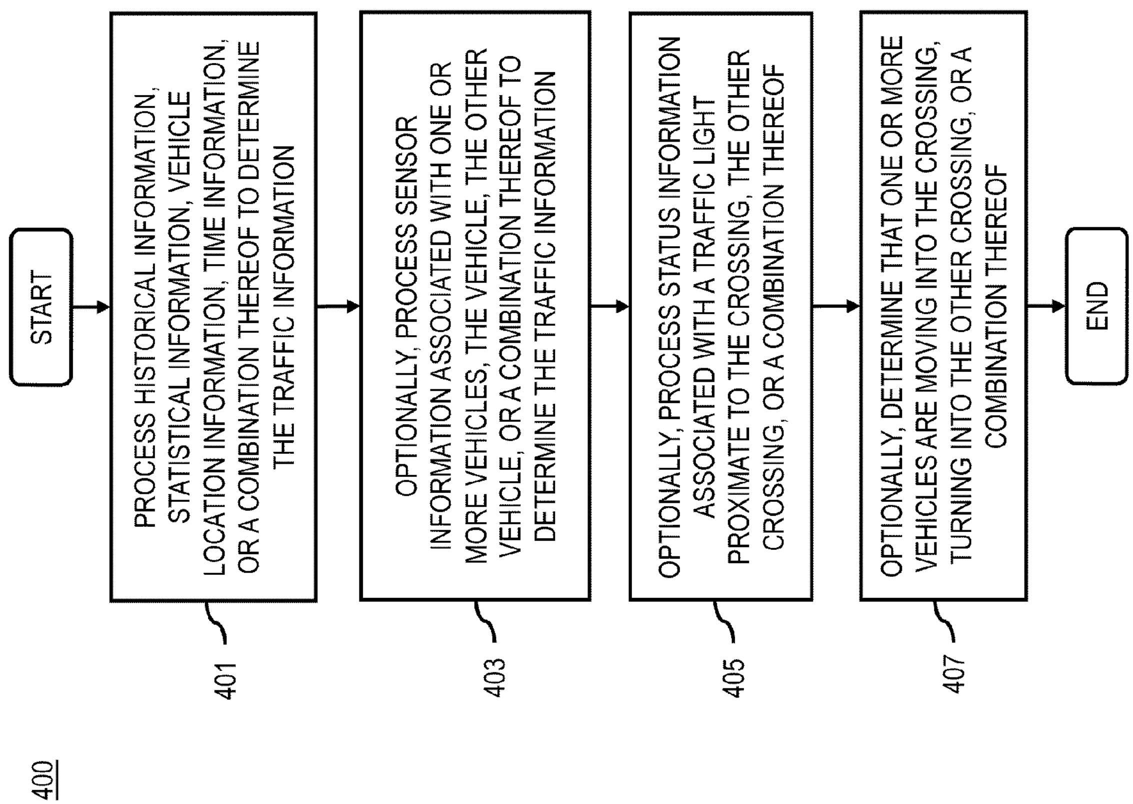

FIG. 4
400
START
PROCESS HISTORICAL INFORMATION, STATISTICAL INFORMATION, VEHICLE LOCATION INFORMATION, TIME INFORMATION, OR A COMBINATION THEREOF TO DETERMINE THE TRAFFIC INFORMATION
401
OPTIONALLY, PROCESS SENSOR INFORMATION ASSOCIATED WITH ONE OR MORE VEHICLES, THE VEHICLE, THE OTHER VEHICLE, OR A COMBINATION THEREOF TO DETERMINE THE TRAFFIC INFORMATION
403
OPTIONALLY, PROCESS STATUS INFORMATION ASSOCIATED WITH A TRAFFIC LIGHT PROXIMATE TO THE CROSSING, THE OTHER CROSSING, OR A COMBINATION THEREOF
405
OPTIONALLY, DETERMINE THAT ONE OR MORE VEHICLES ARE MOVING INTO THE CROSSING, TURNING INTO THE OTHER CROSSING, OR A COMBINATION THEREOF
407
END

MOBILE STATION
1001
1017
1035
1021
Duplexer
1037
LNA
1033
1019
PA
1039
Down-
Converter
Synthesizer
Up-
Converter
1031
Battery Interface
&
Power Control
1020
1041
Demodulator
RF
Interface
1029
Modulator
1027
1015
1025
Equalizer
1047
Keyboard
1007
Display
1049
SIM Card
1005
DSP
MCU
1003
ASIC BACKPLANE
1009
AUDIO
INTERFACE
CODEC
ADC
DAC
1043
1011
1045
1013
1023
MEMORY
1051

METHOD AND APPARATUS FOR NOTIFYING DRIVERS OF SPACE REQUIRED FOR OTHER VEHICLES

BACKGROUND

Service providers and device manufacturers (e.g., wireless, cellular, etc.) are continually challenged to deliver value and convenience to consumers by, for example, providing compelling network services. One area of development has been the use of location-based services to provide users of mobile devices (e.g., mobile phones, tablets, and/or personal navigation devices) with driving assistant services to improve the quality of their travels, especially while commuting. In particular, vehicles are becoming more and more connected (e.g., through global positioning system (GPS)) and through this connectivity, the location of more and more these vehicles can be made available to service providers and device manufacturers and thereafter to users. However, current location-based services often do not include information regarding unmapped crossings (e.g., a private driveway, a parking lot entry, etc.) along a user's travel route since such specific details may easily inundate a user that is often driving and viewing a relatively small display screen at the same time. In addition, such crossings often lack signs or markings. Consequently, a user driving a vehicle may unintentionally obstruct a second user from accessing the unmapped crossing, which may cause additional traffic jams and may even preventing the first driver from continuing along his or her travel path. Accordingly, service providers and device manufacturers face significant technical challenges in providing a service that notifies users of an upcoming unmapped crossing so that a user can leave sufficient space for another user needing access to the unmapped crossing.

SOME EXAMPLE EMBODIMENTS

Therefore, there is a need for an approach for notifying a user while he or she is driving of an unmapped crossing to prevent the user from unintentionally obstructing access to the crossing.

According to one embodiment, a method comprises processing and/or facilitating a processing of traffic information associated with at least one crossing to determine one or more traffic conditions. The method also comprises determining that the one or more traffic conditions may at least potentially cause at least one obstruction of at least one other crossing by at least one vehicle. The method further comprises causing, at least in part, a presentation of at least one notification regarding the at least one obstruction to at least one device associated with the at least one vehicle, at least one other vehicle that is potentially affected by the at least one obstruction, or a combination thereof based, at least in part, on the one or more traffic conditions.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of traffic information associated with at least one crossing to determine one or more traffic conditions. The apparatus is also caused to determine that the one or more traffic conditions may at least potentially cause at least one obstruction of at least one other crossing by at least one vehicle. The apparatus further causes, at least in part, a presentation of at least one notification regarding the at least one obstruction to at least one device associated with the at least one vehicle, at least one other vehicle that is potentially affected by the at least one obstruction, or a combination thereof based, at least in part, on the one or more traffic conditions.

According to another embodiment, a computer-readable storage medium carries one or more sequences of one or more instructions which, when executed by one or more processors, cause, at least in part, an apparatus to process and/or facilitate a processing of traffic information associated with at least one crossing to determine one or more traffic conditions. The apparatus is also caused to determine that the one or more traffic conditions may at least potentially cause at least one obstruction of at least one other crossing by at least one vehicle. The apparatus further causes, at least in part, a presentation of at least one notification regarding the at least one obstruction to at least one device associated with the at least one vehicle, at least one other vehicle that is potentially affected by the at least one obstruction, or a combination thereof based, at least in part, on the one or more traffic conditions.

According to another embodiment, an apparatus comprises means for processing and/or facilitating a processing of traffic information associated with at least one crossing to determine one or more traffic conditions. The apparatus also comprises means for determining that the one or more traffic conditions may at least potentially cause at least one obstruction of at least one other crossing by at least one vehicle. The apparatus further comprises means for causing, at least in part, a presentation of at least one notification regarding the at least one obstruction to at least one device associated with the at least one vehicle, at least one other vehicle that is potentially affected by the at least one obstruction, or a combination thereof based, at least in part, on the one or more traffic conditions.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side (e.g., via the computer system of FIG. 8) or on the mobile device side (e.g., via the mobile device of FIG. 10) or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3-5 are flowcharts of processes for notifying a user while he or she is driving of an unmapped crossing to prevent the user from unintentionally obstructing access to the crossing, according to one embodiment;

DESCRIPTION OF SOME EMBODIMENTS

Examples of a method, apparatus, and computer program for notifying a user while he or she is driving of an unmapped crossing to prevent the user from unintentionally obstructing access to the crossing are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
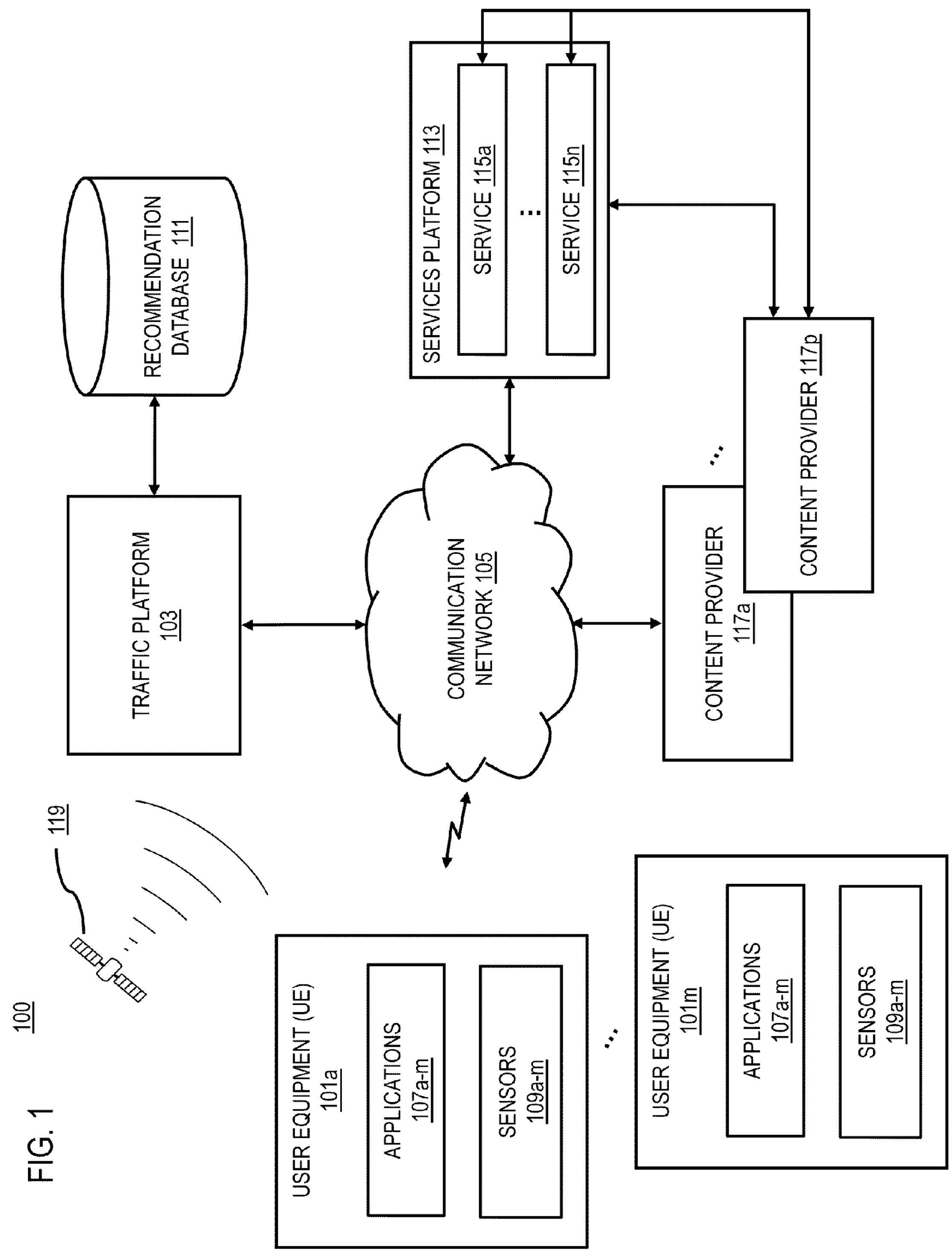
FIG. 1 is a diagram of a system capable of notifying a user while he or she is driving of an unmapped crossing to prevent the user from unintentionally obstructing access to the crossing, according to one embodiment.

FIG. 1 is a diagram of a system capable of notifying a user while he or she is driving of an unmapped crossing to prevent the user from unintentionally obstructing access to the crossing, according to one embodiment. As previously discussed, one area of interest among service providers and device manufacturers has been the development of location-based services to provide users of mobile devices (e.g., mobile phones, tablets, and/or personal navigation devices) with driving assistant services to improve the quality of their travels, particularly while commuting. More specifically, vehicles are becoming more and more connected (e.g., through GPS) and through this connectivity, the location of more and more of these vehicles can be made available to service providers and device manufactures and thereafter to users. However, current location-based services often do not include information regarding unmapped crossings (e.g., a private driveway, a parking lot entry, etc.) along a user's travel route since such specific details may easily inundate a user that is often driving and viewing a relatively small display screen at the same time. Moreover, such crossings often lack signs or markings. As a result, a user driving a vehicle may unintentionally obstruct or block another user from accessing the crossing, which may cause additional traffic jams and may even possibly prevent the first user from continuing along his or her travel path.

To address this problem, a system 100 of FIG. 1 introduces the capability to notify a user while he or she is driving of an unmapped crossing to prevent the user from unintentionally obstructing access to the crossing. As shown in FIG. 1, the system 100 comprises one or more user equipment (UE) 101*a*-101*m* (e.g., mobile phones, tablets, personal navigation devices, and/or stand-along projecting devices) having connectivity to a traffic platform 103 via a communication network 105. The UEs 101 also include or have access to one or more applications 107*a*-107*m* (also collectively referred to as applications 107). By way of example, the applications 107 may include mapping and/or navigation applications, an Internet browser, social networking applications (e.g., a location "check-in" application), media-based applications (e.g., a sign projection application), etc. In addition, the UEs 101 include one or more sensors 109*a*-109*m* (also collectively referred to as sensors 109). In particular, the sensors 109 may include, for example, a GPS receiver, a compass, a magnetometer, an accelerometer, or a combination thereof. In one embodiment, the traffic platform 103 is a computer system (e.g., a server) as described with respect the FIG. 7 below.

In one embodiment, the traffic platform 103 may include or be associated with at least one recommendation database 111. In one example embodiment, the recommendation database 111 may exist in whole or in part within the traffic platform 103, or independently. More specifically, the recommendation database 111 may include one or more navigation instructions (e.g., "slow down," "speed up," "allow for more space," "stop before the intersection," etc.), historical information, statistical information, time information, or a combination thereof (e.g., Route "101" is very busy Monday through Friday between 7:30 and 10:30 a.m. and between 4:30 and 6:30 p.m.).

The UEs 101 are also connected to a services platform 113 via the communication network 105. The services platform 113 includes one or more services 115*a*-115*n* (also collectively referred to as services 115). The services 115 may include a wide variety of services such as content provisioning services for one or more of the applications 107. By way of example, the services 115 may include mapping and/or navigation services, traffic services (e.g., a local traffic service), location-based services (e.g., traffic and/or weather updates), media related services, social networking services, etc. The UEs 101, the services platform 113, and the services 115 also have connectivity to one or more content providers 117*a*-117*p* (also collectivity referred to as content providers 117). The content providers 117 also may provision a wide variety of content (e.g., map and/or navigation data) to the components of the system 100.

In certain embodiments, one or more of the applications 107 may utilize location-based technologies (e.g., GPS, cellular triangulation, Assisted GPS (A-GPS), etc.) to make a request to one or more services 115 for location-based data (e.g., mapping and/or navigation information, weather-related information, etc.) based on a position relative to a UE 101. For example, a UE 101 may include a GPS receiver to obtain geographic coordinates from the satellites 119 to determine its current location.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a mobile device, phone, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is noted that, in the various embodiments described herein the term mobile device is used synonymously with the UEs 101, mobile terminal, mobile phone, and/or any other mobile device listed above. It is also contemplated that the UEs 101 can support any type of interface to the user (such as "wearable" circuitry, etc.). In one embodiment, the UEs 101 are mobile devices (e.g., handsets, mobile phones, etc.) as described with respect to FIG. 10 below.

In one embodiment, the system 100 processes and/or facilitates a processing of traffic information associated with at least one crossing to determine one or more traffic conditions (e.g., a rate or degree of traffic). In particular, the at least one crossing is an unmapped vehicular crossing (e.g., a private driveway, a parking lot entryway, an intersection with or without a traffic light, etc.). In addition, in one example use case, the one or more traffic conditions may include, at least in part, a user driving at least one vehicle (e.g., vehicle "A") north on Route "101" ahead of the intersection of Route "101" and Route "202", for example, and one or more vehicles driving south on the same road, at the same time. In another example use case, the one or more traffic conditions may include, at least in part, one or more vehicles (e.g., vehicle "C") crossing the intersection or Route "101" and Route "202" and getting stuck right after the intersection due to a traffic jam ahead, for example.

In one or more embodiments, the system 100 processes and/or facilitates a processing of historical information, statistical information, vehicle location information, time information, or a combination thereof to determine the traffic information. In one embodiment, it is contemplated that the system 100 can process historical information such as the public transportation bus "Z" makes frequent stops on Route "101", for example, and/or statistical information such as on Monday through Friday an average of 100 vehicles cross the intersection of Route "101" and Route "202" in one or more directions between 7:30 a.m. and 9:00 a.m., but on the weekends only an average of two vehicles cross the intersection between those times. In addition, the statistical information may include information such as the average length of time between green traffic lights at a particular intersection (e.g., the intersection of Route "101" and Route "202"). Further, the system 100 can process vehicle location information such as there are currently two vehicles approaching the intersection of Route "101" and Route "202", and each vehicle is traveling at approximately 35 miles per hour. Likewise, the system 100 can process time information such as it is currently 8:00 a.m. on a Friday, for example. Consequently, the system 100 is able to determine the amount and the rate of traffic proximate to the at least one crossing, the at least one other crossing, or a combination thereof (e.g., an unmapped crossing).

In one embodiment, the system 100 can process and/or facilitate a processing of sensor information associated with one or more vehicles, the at least one vehicle, the at least one other vehicle, or a combination thereof (e.g., GPS information) to determine the traffic information (e.g., the current rate of traffic on Route "101"). By way of example, the sensor information may be based, at least in part, one or more location-based technologies associated with the one or more vehicles, at least one device associated with the one or more vehicles, or a combination thereof (e.g., GPS, a compass, a magnetometer, turning signals, an ignition system, etc.). As previously discussed, vehicles are more and more becoming connected (e.g., through GPS) and through this connectivity, the location of more and more vehicles can be made available to the system 100. In one example use case, the system 100 can determine based, at least in part, on GPS, a compass, and/or turning signals associated with the one or more vehicles, for example, that one or more vehicles are stuck ahead of the at least one crossing and/or that the one or more vehicles are attempting to turn into the at least one other crossing. In addition, the system 100 can determine that at least one other vehicle (e.g., vehicle "B") is immediately behind the at least one vehicle (e.g., vehicle "A") and both vehicles are approaching an unmapped crossing. As a result, the system 100 can determine that the at least one other vehicle may also be potentially affected by the at least one vehicle unintentionally obstructing the at least one crossing.

In one or more embodiments, the system 100 can also process and/or facilitate a processing of status information associated with one or more traffic lights proximate to the at least one crossing, the at least one other crossing, or a combination thereof (e.g., a red light status or a green light status) to further determine the traffic information. In one embodiment, it is contemplated that the system 100 can use the status information to compliment the vehicle location information, for example, and therefore determine the one or more traffic patterns in substantially real-time, for example. In addition, when one or more vehicles approach a red traffic light, the drivers of the one or more vehicles often leave a certain distance between the one or more vehicles as a result of the traffic light and in one embodiment, the system 100 can determine the traffic information based, at least in part, on the one or more patterns created as a result. Moreover, in one embodiment, it is contemplated that if the system 100 determines that an area is known for having traffic jams generated by at least one crossing, at least one other crossing, or a combination thereof (e.g., based on historical and/or statistical information), then the system 100 can inform a traffic light system (e.g., a traffic service 115) that one or more vehicles that routinely drive in this area (e.g., use a parking lot entry) are approaching this area (e.g., <500 m based on GPS) and can then cause, at least in part, the traffic light system to temporarily adapt one or more traffic light conditions to ease the traffic at this location.

In one embodiment, the system 100 can determine that the one or more vehicles (e.g., vehicle "C") are stuck ahead of the at least one crossing (e.g., the intersection of Route "101" and Route "202), that one or more vehicles are attempting to turn into the at least one other crossing (e.g., a parking lot entry), or a combination thereof, wherein the traffic conditions are further based, at least in part, on the one or more vehicles. In one example use case, if the system 100 determines that one or more vehicles are stuck and/or that one or more vehicles are attempting to turn into the at least one other crossing (e.g., a parking lot entry), then the system 100 can determine based, at least in part, on the traffic information that the one or more traffic conditions may at least potentially cause at least one obstruction of at least one other crossing by the at least one vehicle (e.g., vehicle "A").

In one or more embodiments, the system 100 then determines that the one or more traffic conditions may at least potentially cause at least one obstruction of the at least one crossing by at least one vehicle. By way of example, if the one or more traffic conditions include, at least in part, a user driving at least one vehicle north on Route "101" ahead of the intersection of Route "101" and Route "202", for example, and one or more vehicles driving south on the same road, at the same time, then the system 100 can determine that this traffic condition may at least potentially cause at least one obstruction. In another example use case, if the one or more traffic conditions include one or more vehicles crossing the intersection of Route "101" and Route "202", for example, while a traffic jam has formed ahead, then the system 100 can determine that this traffic condition may at least potentially cause at least one obstruction.

In one or more embodiments, the system 100 causes, at least in part, a generation of one or more navigation instructions to cause a prevention of the at least one obstruction (e.g., vehicle "A" blocking the at least one other crossing). In particular, the one or more navigation instructions include, at least in part, at least one recommendation of an alternative speed, an alternative spacing, an alternative location, or a combination thereof for the at least one vehicle (e.g., vehicle "A"), the at least one other vehicle (e.g., vehicle "B" immediately behind vehicle "A"), or a combination thereof. By way of example, the system 100 can generate a navigation instruction that vehicle "A" should slow down since an unmapped crossing is approaching or that vehicle "A" should slow down since the traffic light at the intersection of Route "101" and Route "201" is red and one or more vehicles are beginning to back up. In addition, the system 100 can generate a navigation instruction that vehicle "A" should slow down since it is rush hour and the traffic on Route "101" is heaviest at this time and therefore vehicle "A" is likely to unintentionally obstruct the at least one other crossing or that vehicle "A" should not stop at the at least one crossing, which may or may not have a sign or marker, in case one or more approaching vehicles want to access the crossing (e.g., a parking lot entry).

In one embodiment, the system 100 then causes, at least in part, a presentation of the at least one notification regarding the at least one obstruction to at least one device associated with the at least one vehicle, the at least one other vehicle that is potentially affected by the at least one obstruction, or a combination thereof based, at least in part, on the one or more traffic conditions. More specifically, in one embodiment, the at least one notification includes, at least in part, the one or more navigation instructions. For example, the at least one device may include one or more mobile devices (e.g., a mobile phone, a tablet, and/or a personal navigation device) as well as an in-dash car navigation system that may or may not be connected with the one or more mobile devices. In one or more embodiments, the at least one device may also include a stand-alone projecting device that can project a sign or notification (e.g., "Do not stop here") on the road at the at least one other crossing (e.g., a parking lot entry) to prevent the at least one vehicle from stopping here in case one or more approaching vehicles want to access the crossing (e.g., detected by the system 100 through an in-dash car navigation system).

In one or more embodiments, the system 100 causes, at least in part, at least one modification of the presentation of the at least one notification based, at least in part, on the one or more traffic conditions, one or more contexts, or a combination thereof. By way of example, based on historical and/or statistical information, for example, stored in the at least one recommendation database 111, for example, such as the public transit bus "Z" does not run on the weekends, only an average of two vehicles stop at the intersection of Route "101" and Route "202" on the weekends, and the average time between green traffic lights is greater than during the week and the time information such as it is currently Saturday at 3:00 p.m., the system 100 can determine not to present the at least one notification since it is very unlikely the at least one obstruction will be present. Without the potential for an obstruction, the at least one notification would only serve to annoy a user in this context and therefore is not presented. Further, in one embodiment, it is contemplated that the one or more contexts would include one or more weather and/or lighting conditions. For example, when it is dark and/or the weather is inclement (e.g., raining or snowing), the system 100 may cause, at least in part, the presentation of the at least one notification earlier than when the system 100 would normally cause, at least in part, the presentation to give a user driving more time to safely react to the at least one crossing.

In one or more embodiments, the system 100 can also cause, at least in part, at least one visual depiction of the at least one crossing, the at least one other crossing, or a combination thereof on the at least one device in connection with the at least one notification. As previously discussed, service providers and device manufacturers often do not include unmapped crossings on mapping and/or navigation applications 107, for example, to prevent inundating a user with specific details that may normally be inapplicable to their travels. However, when the system 100 determines that such information would be helpful to a user (e.g., the driver of vehicle "A"), then the system 100 can incorporate the location of the at least one unmapped crossing into a mapping and/or navigation application as an additional layer, for example.

By way of example, the UEs 101, the traffic platform 103, the applications 107, the sensors 109, the at least one recommendation database 111, the services platform 113, the services 115, the content providers 117, and the satellites 119 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
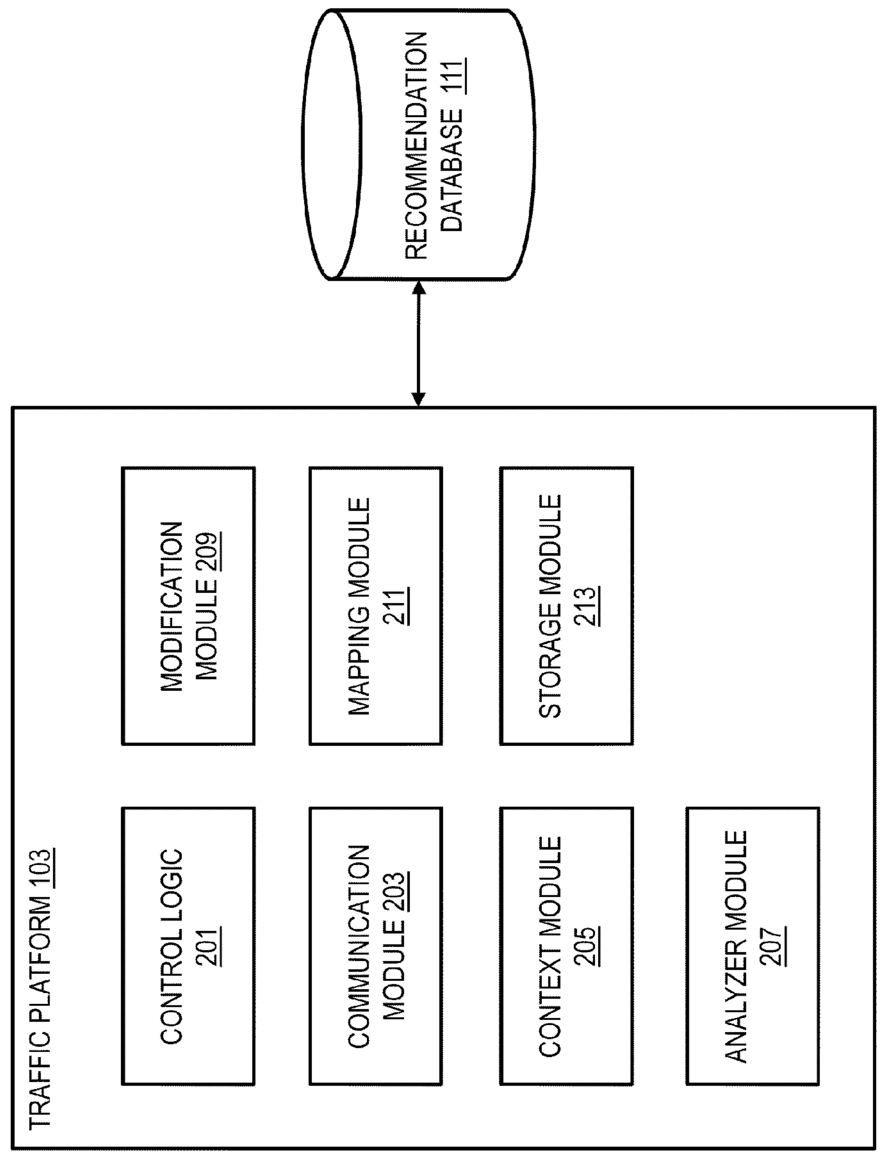
FIG. 2 is a diagram of the components of a traffic platform, according to one embodiment.

FIG. 2 is a diagram of the components of a traffic platform 103, according to one embodiment. By way of example, the traffic platform 103 includes one or more components for notifying a user while he or she is driving of an unmapped crossing to prevent the user from unintentionally obstructing access to the crossing. It is contemplated that the functions of these components may be combined in one or more components or performed by other components of equivalent functionality. In this embodiment, the traffic platform 103 includes a control logic 201, a communication module 203, a context module 205, an analyzer module 207, a modification module 209, a mapping module 211, and a storage module 213.

In one embodiment, the control logic 201 oversees tasks, including tasks performed by the communication module 203, the context module 205, the analyzer module 207, the modification module 209, the mapping module 211, and the storage module 213. For example, although the other modules may perform the actual task, the control logic 201 may determine when and how those tasks are performed or otherwise direct the other modules to perform the task. In one embodiment, the control logic 201 may also be used to cause, at least in part, a generation of one or more navigation instructions to cause a prevention of the at least one obstruction. For example, the one or more navigation instructions include, at least in part, at least one recommendation of an alternative speed (e.g., "slow down, crossing ahead"), an alternative spacing, an alternative location (e.g., "Do not stop here"), or a combination thereof. The control logic 201 also may be used in connection with the communication module 203 to cause, at least in part, a presentation of at least one notification (e.g., one or more navigation instructions) regarding the at least one obstruction to at least one device associated with the at least one vehicle (e.g., a mobile phone, a tablet, and/or a personal navigation device), at least one other vehicle that is potentially affected by the at least one obstructions, or a combination thereof based, at least in part, on the one or more traffic conditions. More specifically, as discussed above, the control logic 201 will not cause the presentation of the at least one notification when the traffic conditions do not warrant such a notification (e.g., when there is no traffic).

In one or more embodiments, the communication module 203 is used for communication between the UEs 101, the traffic platform 103, the applications 107, the sensors 109, the at least one recommendation database 111, the services platform 113, the services 115, the content providers 117, and the satellites 119. The communication module 203 may also be used to communicate commands, requests, data, etc.

In one embodiment, the context module 205 is used to process and/or facilitate a processing of traffic information associated with at least one crossing to determine one or more traffic conditions. In particular, the context module 205 determines the rate and the amount of traffic proximate to an unmapped crossing to determine the traffic conditions in that area that may affect the accessibility to at least one crossing, at least one other crossing, or a combination thereof. The context module 205 may also be used to process and/or facilitate a processing of status information associated with one or more traffic lights proximate to at least one crossing, at least one other crossing, or a combination thereof. For example, if the one or traffic lights are connected to a traffic service than the context module 205 can determine whether a particular traffic light is red or green as well as the average amount of time that the traffic light stays green, for example. The context module 205 also may be used to determine that one or more vehicles are stuck ahead of the at least one crossing, are attempting to turn into the at least one other crossing, or a combination thereof. For example, the context module 205 may determine the location of the one or more vehicles based, at least in part, on a GPS receiver in the car and/or the at least one device also having a GPS receiver and the context module 205 may determine that the one or more vehicles are turning based on the vehicle's turning signals and/or a compass associated with the at least one device.

In one or more embodiments, the analyzer module 207 is used to process and/or facilitate a processing of historical information, statistical information, vehicle location information, time information, or a combination thereof to determine traffic information. For example, the analyzer module 207 can process historical and statistic information, for example, stored in the at least one recommendation database 111, for example, for a particular intersection (e.g., the intersection of Route "101" and Route "202"). In one embodiment, the analyzer module 207 can process one or more driving patterns and/or destination identifications based, at least in part, on a user profile, a time, a date, or a combination thereof associated with the at least one device (e.g., a mobile phone, a tablet, and/or a personal navigation device). The analyzer module 207 may also be used to process and/or facilitate a processing of sensor information associated with the one or more vehicles (e.g., a GPS receiver, a compass, a turning signal, an ignition system, etc.), the at least one vehicle, the at least one other vehicle, or a combination thereof to determine the traffic information. The analyzer module 207 also may be used to determine that the one or more traffic conditions may at least potentially cause at least one obstruction of at least one other crossing by at least one vehicle. By way of example, if the context module 205 determines that one or more vehicles are stuck ahead of the at least one crossing and/or that one or more vehicles are attempting to turn into the at least one other crossing and that at least one vehicle is approaching the at least one crossing, the at least one other crossing, or a combination thereof, then the analyzer module 207 can determine that the at least one vehicle may at least potentially cause at least one obstruction.

In one embodiment, the modification module 209 is used to cause, at least in part, at least one modification of the presentation of the at least one notification based, at least in part, on the one or more traffic conditions, one or more contexts, or a combination thereof. By way of example, the modification module 209 can prevent the control logic 201 from causing, at least in part, a presentation of the at least one notification during times where there is no traffic and/or the modification module 209 can cause the control logic 201 to cause, at least in part, the presentation of the at least one notification to occur earlier than normal during times of inclement weather and/or at night, for example.

In one or more embodiments, the mapping module 211 is used to cause, at least in part, at least one visual depiction of the at least one crossing, the at least one other crossing, or a combination thereof on the at least one device in connection with the at least one notification. For example, the mapping module 211 can cause, at least in part, an activation of an unmapped crossing layer on a mapping and/or navigation application 107, for example. In one embodiment, the storage module 213 is used to manage the storage of one or more navigation instructions (e.g., "slow down," "speed up," "allow for more space," "stop before intersection," etc.), historical information, statistical information, time information, or a combination thereof also possibly stored in the at least one recommendation database 111.

Figure 3:
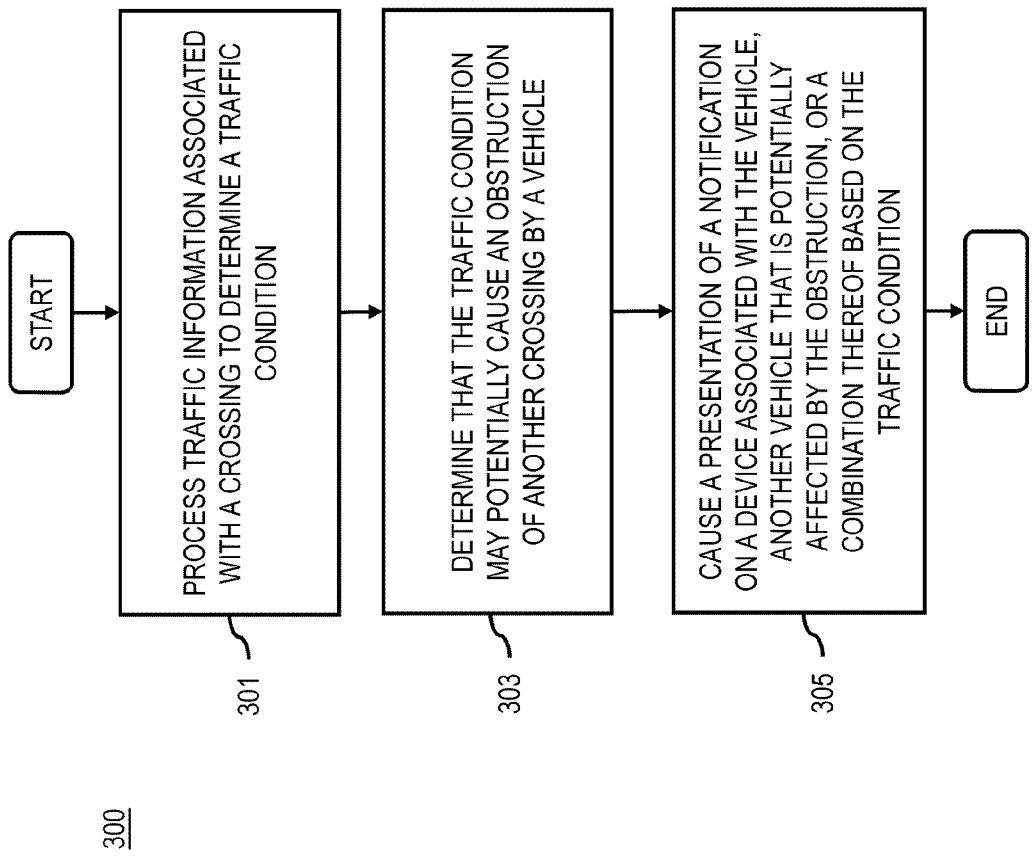
Figure 5:
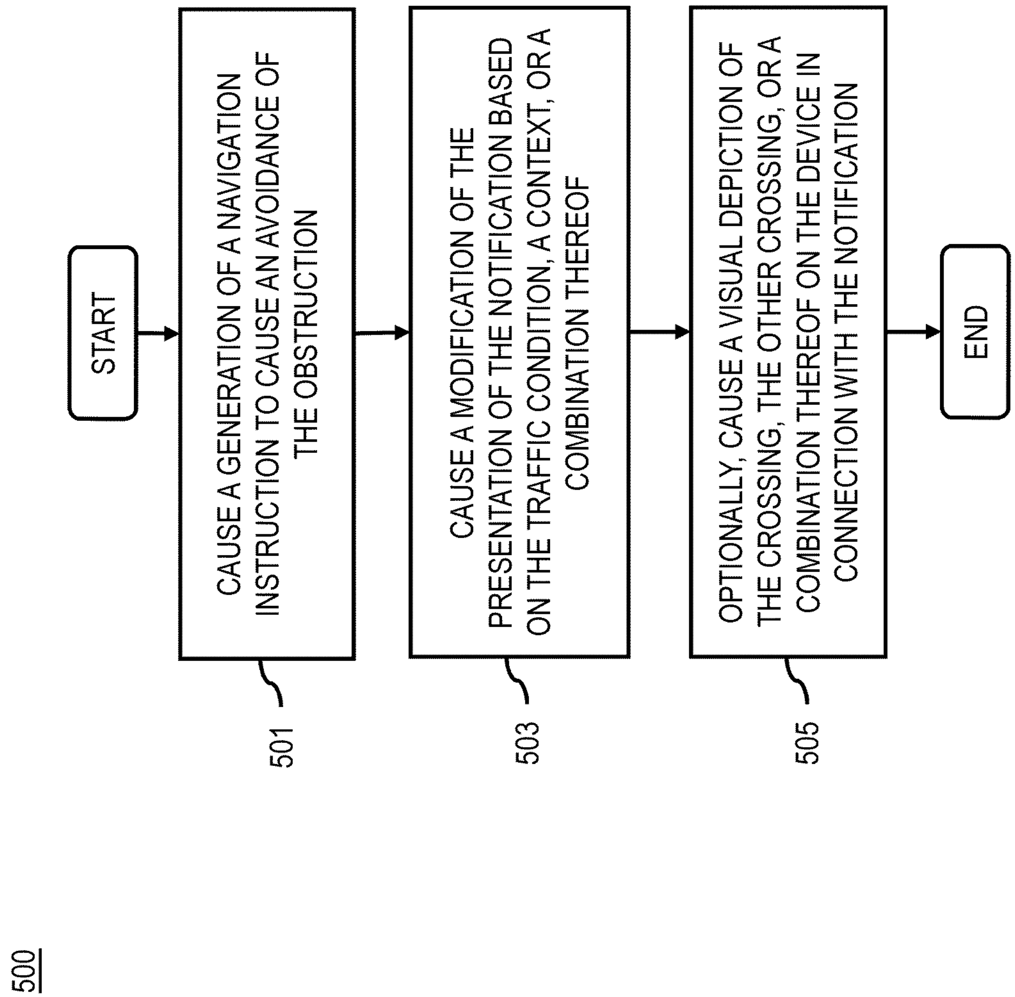
Figure 9:
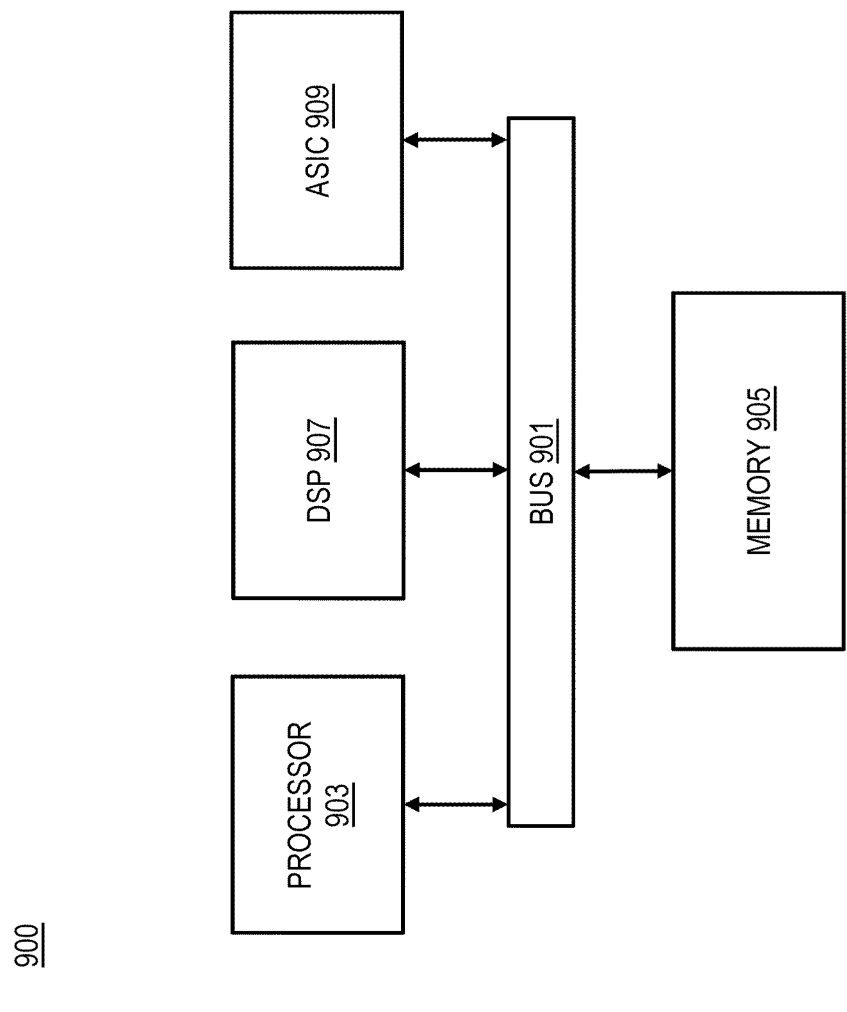
FIG. 9 is a diagram of a chip set that can be used to implement an embodiment of the invention.

FIGS. 3-5 are flowcharts of processes for notifying a user while he or she is driving of an unmapped crossing to prevent the user from unintentionally obstructing access to the crossing, according to one embodiment. In one embodiment, the traffic platform 103 performs the process 300 and is implemented in, for instance, a chip set including a processor and a memory as shown in FIG. 9. In step 301, the traffic platform 103 processes and/or facilitates a processing of traffic information associated with at least one crossing to determine one or more traffic conditions. As previously discussed, that least one crossing is an unmapped vehicular crossing (e.g., a private driveway, a parking lot entryway, an intersection with or without a traffic light, etc.). In addition, in one example use case, the one or more traffic conditions may include, at least in part, a user driving at least one vehicle north on Route "101", for example, ahead of the intersection of Route "101" and Route "202" and one or more vehicles driving south on the same road, at the same time. In another example use case, the one or more traffic conditions may include one or more vehicles crossing the intersection of Route "101" and Route "202", for example, while there is a traffic jam ahead.

In step 303, the traffic platform 103 determines that the one or more traffic conditions may at least potentially cause at least one obstruction of at least one other crossing by at least one vehicle. By way of example, if the traffic platform 103 determines that at least one vehicle is driving north on Route "101" and there is a traffic light at the intersection of the Route "101" and Route "202" and one or more vehicles are driving south on the road at the same time, if the traffic light turns red, then the traffic platform 103 can determine that the at least one vehicle may unintentionally obstruct the one or more vehicles from accessing an unmapped crossing on the east side of the road (e.g., an entryway to an office building). Similarly, the traffic platform 103 can determine that if one or more vehicles have recently crossed the intersection of Route "101" and Route "202", for example, and the one or more vehicles are stuck because of a traffic jam ahead, then the traffic platform 103 can determine that the at least one vehicle may unintentionally obstruct the at least one crossing if the user attempts to go through the green traffic light of the intersection at that time.

In step 305, the traffic platform 103 causes, at least in part, a presentation of at least one notification regarding the at least one obstruction to at least one device associated with the at least one vehicle, at least one other vehicle that is potentially affected by the at least one obstruction, or a combination thereof based, at least in part, on the one or more traffic conditions. By way of example, the at least one notification includes, at least in part, one or more navigation instructions. More specifically, the one or more navigation instructions include, at least in part, at least one recommendation of an alternative speed, an alternative spacing, an alternative location, or a combination thereof for the at least one vehicle, the at least one other vehicle, or a combination thereof. Moreover, the at least one device may include one or more mobile devices (e.g., a mobile phone, a tablet, and/or a personal navigation) as well as an in-dash car navigation system that may or may not be connected with the one or more mobile devices. In one or more embodiments, the at least one device may also include a stand-along projecting device to project a sign or notification (e.g., "Do not stop here") on the road at the at least one crossing (e.g., a parking lot entry) to prevent the at least one vehicle from stopping here in case one or more approaching vehicles want to access the crossing (e.g., detected by the traffic platform 103 through an in-dash car navigation system).

FIG. 4 depicts a process 400 of determining traffic information associated with at least one crossing. In one embodiment, the traffic platform 103 performs the process 400 and is implemented in, for instance, a chip set including a processor and a memory as shown in FIG. 9. In step 401, the traffic platform 103 processes and/or facilitates a processing of historical information, statistical information, vehicle location information, time information, or a combination thereof to determine the traffic information. By way of example, the traffic platform 103 can process historical information such as the public transportation bus "Z" makes frequent stops on Route "101", for example, and/or statistical information such as on Monday through Friday an average of 100 vehicles stop at the intersection of Route "101" and Route "202" between 7:30 a.m. and 9:00 a.m., but on the weekends only an average of two vehicles stop at the intersection between those times. Moreover, the statistical information may include information such as the average time between green traffic lights at a particular intersection (e.g., the intersection of Route "101" and Route "202"). Further, the traffic platform 103 can process vehicle location information such as there are currently two vehicles approaching the intersection of Route "101" and Route "202" and each vehicle is traveling at approximately 35 miles per hour and time information such as it is currently 8:00 a.m. on a Friday. As a result, the traffic platform 103 is able to determine the traffic information associated with the at least one crossing, the at least one other crossing, or a combination thereof (e.g., an unmapped crossing).

In step 403, the traffic platform 103 optionally processes and/or facilitates a processing of sensor information associated with the one or more vehicles, the at least one vehicle, the at least one other vehicle, or a combination thereof to determine the traffic information. By way of example, the sensor information may be derived from one or more location-based technologies associated with the one or more vehicles, at least one device associated with the one or more vehicles, or a combination thereof (e.g., GPS, a compass, a magnetometer, turning signals, an ignition systems, etc.) to determine the current rate of traffic in a particular area. As previously discussed, vehicles are more and more becoming connected (e.g., through GPS) and through this connectivity, the location of more and more vehicles can be made available to the traffic platform 103. In one example use case, the traffic platform 103 can determine based on GPS, a compass, and/or turning signals associated with the one or more vehicles that one or more vehicles, for example, are stuck ahead of the at least one crossing and/or that the one or more vehicles are attempting to turn into the at least one other crossing. In addition, the traffic platform 103 can determine that at least one other vehicle (e.g., vehicle "B") is behind the at least one vehicle (e.g., vehicle "A") that is approaching an unmapped crossing and that the at least one other vehicle may also be potentially affected by the at least one vehicle unintentionally obstructing the at least one crossing.

In step 405, the traffic platform 103 optionally processes and/or facilitates a processing of status information associated with one or more traffic lights proximate to the at least one crossing, the at least one other crossing, or a combination, wherein the traffic information is further based, at least in part, on the status information. In one embodiment, it is contemplated that the traffic platform 103 can use the status of the one or more traffic lights (e.g., green or red) to compliment the vehicle location information, for example, and therefore determine the one or more traffic patterns in substantially real-time. For example, when one or more vehicles approach a red light, the drivers of the one or more vehicles often leave a certain distance between the one or more vehicles and the traffic platform 103 can determine the traffic information based, at least in part, on the pattern of one or more vehicles created as a result. In one embodiment, it is further contemplated that if the traffic platform 103 determines that an area is known for having traffic jams generated by at least one crossing, at least one other crossing, or a combination thereof (e.g., based on historical and/or statistical information), then the traffic platform 103 can inform a traffic light system (e.g., a traffic service 115) that one or more vehicles that routinely drive in this area (e.g., use a parking lot entry) are approaching this area (e.g., <500 m based on GPS) and can then cause, at least in part, the traffic light system to temporarily adapt one or more traffic light conditions to ease the traffic at this location.

In step 407, the traffic platform 103 optionally determines that one or more vehicles are stuck ahead of the at least one crossing, attempting to turn into the at least one other crossing, or a combination thereof, wherein the traffic conditions are further based, at least in part, on the one or more vehicles. In one example use case, if the traffic platform 103 determines that one or more vehicles are stuck and/or that one or more vehicles are attempting to turn, the traffic platform 103 can determine based, at least in part, on the traffic information that the one or more traffic conditions may at least potentially cause at least one obstruction of at least one other crossing by at least one vehicle.

FIG. 5 depicts a process 500 of presenting at least one notification regarding at least one obstruction to at least one device associated with at least one vehicle. In one embodiment, the traffic platform 103 performs the process 500 and is implemented in, for instance, a chip set including a processor and a memory as shown in FIG. 9. In step 501, the traffic platform 103 causes, at least in part, a generation of one or more navigation instructions to cause a prevention of the at least one obstruction, wherein the at least one notification includes, at least in part, the one or more navigation instructions. In particular, the one or more navigation instructions include, at least in part, at least one recommendation of an alternative speed, an alternative spacing, an alternative location, or a combination thereof for the at least one vehicle (e.g., vehicle "A"), the at least one other vehicle (e.g., vehicle "B" immediately behind vehicle "A"), or a combination thereof. For example, the traffic platform 103 can generate a navigation instruction that vehicle "A" should slow down since an unmapped crossing is approaching or that vehicle "A" should slow down since the traffic light at the intersection of Route "101" and Route "202" is red and one or more vehicles are beginning to back up. In addition, the traffic platform 103 can generate a navigation instruction that vehicle "A" should slow down since it is rush hour and the traffic on Route "101" is heaviest at this time and therefore vehicle "A" is likely to unintentionally obstruct the at least one crossing or that vehicle "A" should not stop at the at least one crossing, which may or may not have a sign or marking, in case one or more approaching vehicles want to access the crossing (e.g., a parking lot entry).

In step 503, the traffic platform 103 causes, at least in part, at least one modification of the presentation of the at least one notification based, at least in part, on the one or more traffic conditions, one or more contexts, or a combination thereof. By way of example, based on historical information, statistical information, or a combination thereof, for example, stored in the at least one recommendation database 111, for example, such as only an average of two vehicles stop at the intersection of Route "101" and Route "202" on the weekends and the time information (e.g., it is currently Saturday at 3:00 p.m.), the traffic platform 103 can cause a modification of that least one presentation and therefore not present the at least one notification regarding the at least one obstruction since it is very unlikely that the at least one obstruction will be present. Without the potential of an obstruction, the at least one notification would serve to annoy the user and therefore is not presented. Further, in one embodiment, it is contemplated that the one or more contexts would include one or more weather and/or lighting conditions. For example, when its dark and/or the weather is inclement (e.g., raining or snowing), the traffic platform 103 may cause, at least in part, the presentation of the at least one notification earlier than when the traffic platform 103 would normally cause, at least in part, the presentation to give the user driving more time to safely react to the at least one crossing.

In step 509, the traffic platform 103 optionally causes, at least in part, at least one visual depiction of the at least one crossing, the at least one other crossing, or a combination thereof on the at least one device in connection with the at least one notification. As previously discussed, service providers and device manufacturers often do not include unmapped crossings on mapping and/or navigation applications 107, for example, to prevent inundating a user with specific details that may normally be inapplicable to his or her travels. However, when the traffic platform 103 determines that such information would be helpful to a user (e.g., the driver of vehicle "A"), then the traffic platform 103 can incorporate the location of the at least one unmapped crossing into a mapping and/or navigation application as an additional layer, for example.

Figure 6A:
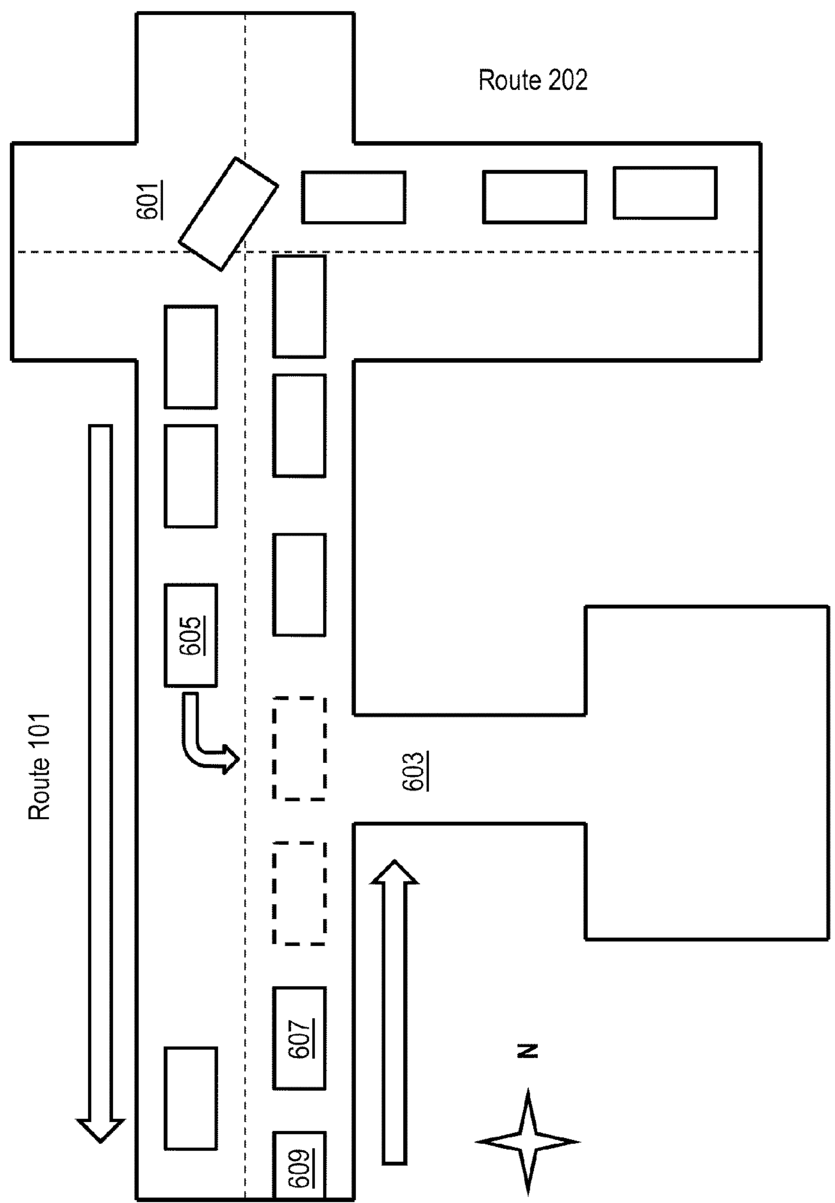
FIGS. 6A and 6B are diagrams of example use cases depicting the utilization of the processes of FIGS. 3-5, according to various embodiments.
Figure 6B:
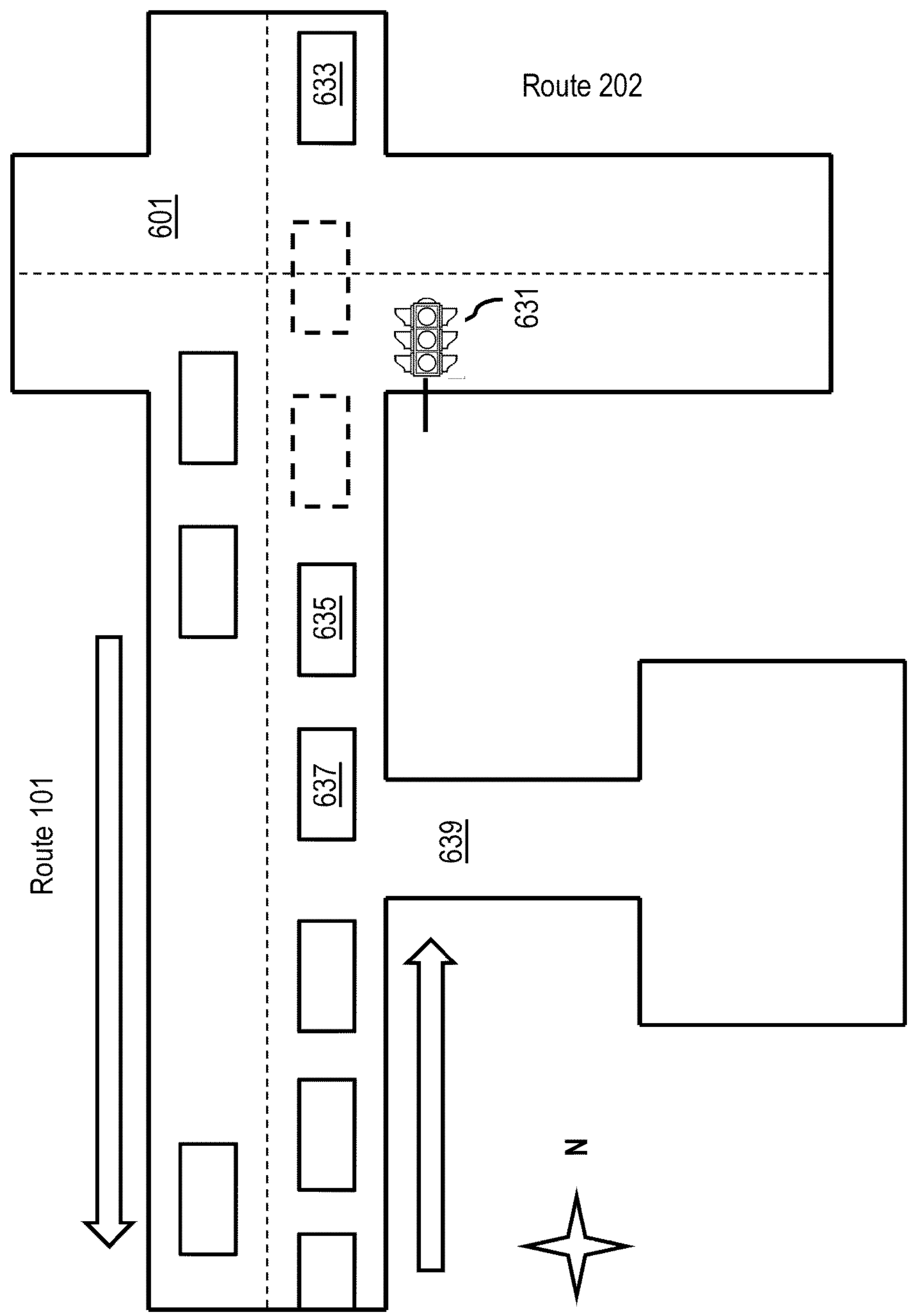

FIGS. 6A and 6B are diagrams of example use cases depicting the utilization of the processes of FIGS. 3-5, according to various embodiments. As shown, FIGS. 6A and 6B depict two example use cases where one or more vehicles are traveling along Route 101 and/or Route 202 at 8:00 a.m. on a Monday morning. In one embodiment, the system 100 processes and/or facilitates a processing of traffic information associated with at least one crossing (e.g., entryway 603) to determine one or more traffic conditions. In particular, the at least one crossing is an unmapped vehicular crossing (e.g., a parking lot entryway). In one embodiment, the system 100 processes and/or facilitates a processing of historical information, statistical information, vehicle location information, time information, or a combination thereof to determine the traffic information. For example, the system 100 can determine from historical and/or statistical information, for example, stored in at least one database (e.g., the at least one recommendation database 111), for example, that on Monday through Friday an average of 100 vehicles cross the intersection of Route 101 and Route 202 in one or more directions between 7:30 a.m. and 9:00 a.m. In addition, the system 100 can determine from historical and/or statistical information that an area is known for having traffic jams generated by at least one crossing, at least one other crossing, or a combination thereof and that one or more vehicles routinely drive in this particular area (e.g., use a parking lot entry) based, at least in part, on a user profile, a time, a date or a combination thereof associated with at least one device (e.g., a mobile phone).

In one embodiment, the system 100 processes and/or facilitates a processing of sensor information (e.g., GPS) associated with one or more vehicles (e.g., vehicle 605), at least one vehicle (e.g. 607), at least one other vehicle (e.g., vehicle 609) to determine traffic information. In particular, the system 100 determines that the at least one vehicle 607 and the at least one other vehicle 609 are traveling north on Route 101 (e.g., at 35 miles per hour) and one or more vehicles (e.g., vehicle 605) are traveling south on Route 101 at the same time and at the same speed. In addition, the system 100 can determine that vehicle 609 is immediately behind vehicle 607. Moreover, in one embodiment, the system 100 can determine that the one or more vehicles (e.g., vehicle 605) are attempting to turn into the at least one crossing (e.g., entryway 603). In this example use case, the system 100 determines that the vehicle 605 is, in fact, attempting to turn into the unmapped crossing 603 (e.g., based on a turning signal, a route guidance system, a compass associated with the at least one device associated with the vehicle 605, or a combination thereof). In one embodiment, the system 100 determines that the one or more traffic conditions may at least potentially cause at least one obstruction of the at least one crossing 603 by at least one vehicle 607. In this example use case, the system 100 can determine that without forewarning, it is likely that the at least one vehicle 607 and the at least one other vehicle 609 may at least potentially cause at least one obstruction of the at least one crossing 603 as shown by the dashed lines given the time of day (e.g., 8:00 a.m. on a Monday morning) and the current traffic conditions (e.g., rush hour traffic).

In one or more embodiments, the system 100 causes, at least in part, a generation of one or more navigation instructions to cause a prevention of the at least one obstruction (e.g., vehicle 607 blocking the crossing 603 from the vehicle 605). In particular, the one or more navigation instructions include, at least in part, at least one recommendation of an alternative speed, an alternative spacing, an alternative location (e.g., "Do not stop here"), or a combination thereof for the at least one vehicle 607, the at least one other vehicle 609, or a combination thereof. In this example use case, the system 100 can determine to recommend that vehicles 607 and 609 should slow down since the unmapped crossing 603 is approaching and vehicle 605 is attempting to access the crossing 603. In one embodiment, the system 100 then causes, at least in part, a presentation of the at least one notification regarding the at least one obstruction to at least one device associated with the at least one vehicle 607 (e.g., a mobile phone, a tablet, a personal navigation device, and/or an in-dash car navigation system), the at least one other vehicle 609 that is potentially affected by the at least one obstruction, or a combination thereof. In one or more embodiments, it is contemplated that the at least one device may also include a stand-alone projecting device. More specifically, the system 100 causes, at least in part, the presentation to the at least one vehicle 607 at the time when the at least one vehicle 607 was at the location of the at least one other vehicle 609, for example, so that the driver of the at least one vehicle 607 will have ample time before the at least one crossing 603. In this example use case, as a result of the forewarning by the system 100, the at least one vehicle 607 and the at least one vehicle 609 slow down and are able to leave adequate space for the vehicle 605 to access the crossing 603. In addition, in one embodiment, it is contemplated that the same solution can also be applied if the at least one crossing 601 also has a traffic light.

Similar to FIG. 6A, FIG. 6B illustrates an example use case involving one or more vehicles traveling at 8:00 a.m. on a Monday morning along Route 101, however, in this example use case a traffic light 631 is located at the intersection of Route 101 and Route 202. Once again, in one embodiment, the system 100 processes and/or facilitates a processing of traffic information associated with at least one crossing (e.g., intersection 601) to determine one or more traffic conditions (e.g., a rate or degree of traffic). In one or more embodiments, the system 100 then processes and/or facilitates a processing of historical information, statistical information, vehicle location information, time information, or a combination thereof to determine the traffic information. As with the example use case illustrated in FIG. 6A, the system 100 can determine from historical and/or statistical information, for example, stored in at least one database (e.g., the at least one recommendation database 111), for example, that on Monday through Friday between 7:30 a.m. and 9:00 a.m. an average of 100 vehicles cross the intersection of Route 101 and Route 202 in one or more directions. In addition, the statistical information may include information such as the average time between green traffic lights at the traffic light 631. Further, in one embodiment, the system 100 can process and/or facilitate a processing of sensor information associated with the one or more vehicles (e.g., vehicle 633), at least one vehicle 635, at least one other vehicle 637, or a combination thereof to determine the traffic information. For example, the system 100 can determine that the vehicles 633, 635, and 637 are all traveling north on Route 101 and that vehicles 635 and 637 are traveling at 35 miles per hour, but that vehicle 633 appears to have stopped moving. In one or more embodiments, the system 100 can also process and/or facilitate a processing of status information associated with one or more traffic lights (e.g., traffic light 631) proximate to the at least one crossing (e.g., crossing 601), the at least one other crossing (e.g., an unmapped crossing 639), or a combination thereof to further determine the traffic information. In this example use case, the traffic light 631 is green permitting north and south bound traffic to cross the intersection 601.

In one or more embodiments, the system 100 can determine more specifically that the one or more vehicles (e.g., vehicle 633) are stuck ahead of the at least one crossing (e.g., intersection 601). In particular, it is contemplated that the system 100 can determine whether the vehicle 633 is stuck because of a traffic jam and will likely start moving shortly or if the vehicle is stuck due to a mechanical problem suggesting that the vehicle will likely not start moving shortly. In this example use case, the system 100 determines that the vehicle 633 is stopped because of a traffic jam ahead. In one embodiment, the system 100 then determines that the one or more traffic conditions (e.g., the stuck vehicle 633) may at least potentially cause at least one obstruction of the at least one crossing by at least one vehicle (e.g., vehicle 635). In this example use case, the system 100 can determine that without forewarning, at the current direction and rate of speed, the vehicles 635 and 637 will enter the intersection 601 and because of the stuck vehicle 633 the vehicles 635 and 637 may potentially cause at least one obstruction of the at least one crossing 601 as shown by the dashed lines.

In one embodiment, the system 100 causes, at least in part, a generation of one or more navigation instructions to cause a prevention of the at least one obstruction (e.g., vehicle 635 blocking the crossing 601). As previously discussed, the one or more navigation instructions include, at least in part, at least one recommendation of an alternative speed, an alternative spacing, an alternative location, or a combination thereof for the at least one vehicle 635, the at least one other vehicle 637, or a combination thereof. In this example use case, the system 100 generates a navigation instruction to "slow down." In one embodiment, the system 100 then causes, at least in part, a presentation of the at least one notification regarding the at least one obstruction to at least one device associated with the at one vehicle 635, the at least one other vehicle 637 that is potentially affected by the at least one obstruction, or a combination thereof based, at least in part, on the one or more traffic conditions. In particular, the system 100 causes, at least in part, the presentation to the at least one vehicle 635 and the at least one other vehicle 637 at the time when the at least one vehicle 635 was at the location of the at least one other vehicle 637, for example, so that the drivers of the at least one vehicle 635 and the at least other vehicle 637 will have ample time to slow down and even stop before the at least one crossing 601 despite the green traffic light 631 permitting north bound vehicles to cross the intersection 601. As a result of the forewarning by the system 100, the at least one vehicle 635 and the at least one vehicle 637 slow down and stop before the intersection 601 so as to prevent obstructing the crossing 601.

Figure 7:
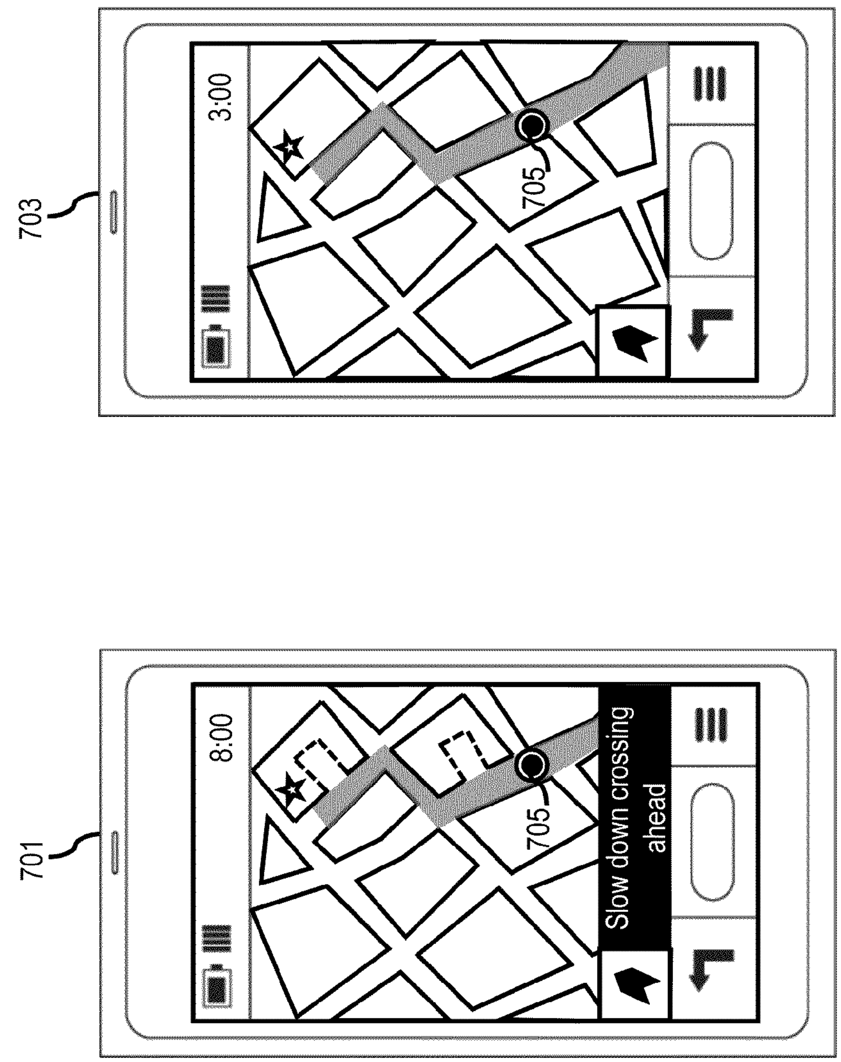
FIG. 7 is a diagram of user interfaces utilized in the processes of FIGS. 3-5, according to various embodiments.

FIG. 7 is a diagram of user interfaces utilized in the processes of FIGS. 3-5, according to various embodiments. As shown, the example user interfaces of FIG. 7 include one or more user interface elements and/or functionalities created and/or modified based, at least in part, on information, data, and/or signals resulting from the processes (e.g., processes 300, 400, and 500) described with respect to FIGS. 3-5. More specifically, FIG. 7 illustrates two user interfaces (e.g., interfaces 701 and 703), depicting a presentation of at least one notification regarding at least one obstruction to at least one device (e.g., interfaces 701 and 703) associated with at least one vehicle, at least one other vehicle that is potentially affected by the at least one obstruction, or a combination thereof based, at least in part, on the one or more traffic conditions.

As previously discussed, in one or more embodiments, the system 100 causes, at least in part, a generation of one or more navigation instructions to cause a prevention of the least one obstruction (e.g., a vehicle blocking an unmapped crossing). In particular, the one or more navigation instructions include, at least in part, at least one recommendation of an alternative speed, an alternative spacing, an alternative location, or a combination thereof for the at least one vehicle represented by the symbol 705. In one example use case, the system 100 presents a navigation instruction "slow down crossing ahead" as depicted in interface 701. In one or more embodiments, the system 100 can also cause, at least in part, at least one visual depiction of the at least one crossing, the at least one other crossing, or a combination thereof on the at least one device (e.g., interfaces 701 and 703) in connection with the at least one notification (e.g., "slow down crossing ahead") as depicted by the dashed lines of interface 701.

In one embodiment, the system 100 causes, at least in part, at least one modification of the presentation of the at least one notification based, at least in part, on the one or more traffic conditions, one or more contexts, or a combination thereof. By way of example, if the system 100 determines that the current day is Saturday and the time is 3:00 p.m. as shown on interface 703 and that on the weekends only an average of two vehicles cross the intersection of Route 101 and Route 202 in one or more directions based on statistical information, for example, then the system 100 can determine not to present the at least one notification regarding the at least one obstruction as shown on interface 703 since there is little potential for the at least one obstruction on the weekends.

The processes described herein for notifying a user while he or she is driving of an unmapped crossing to prevent the user from unintentionally obstructing access to the crossing may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
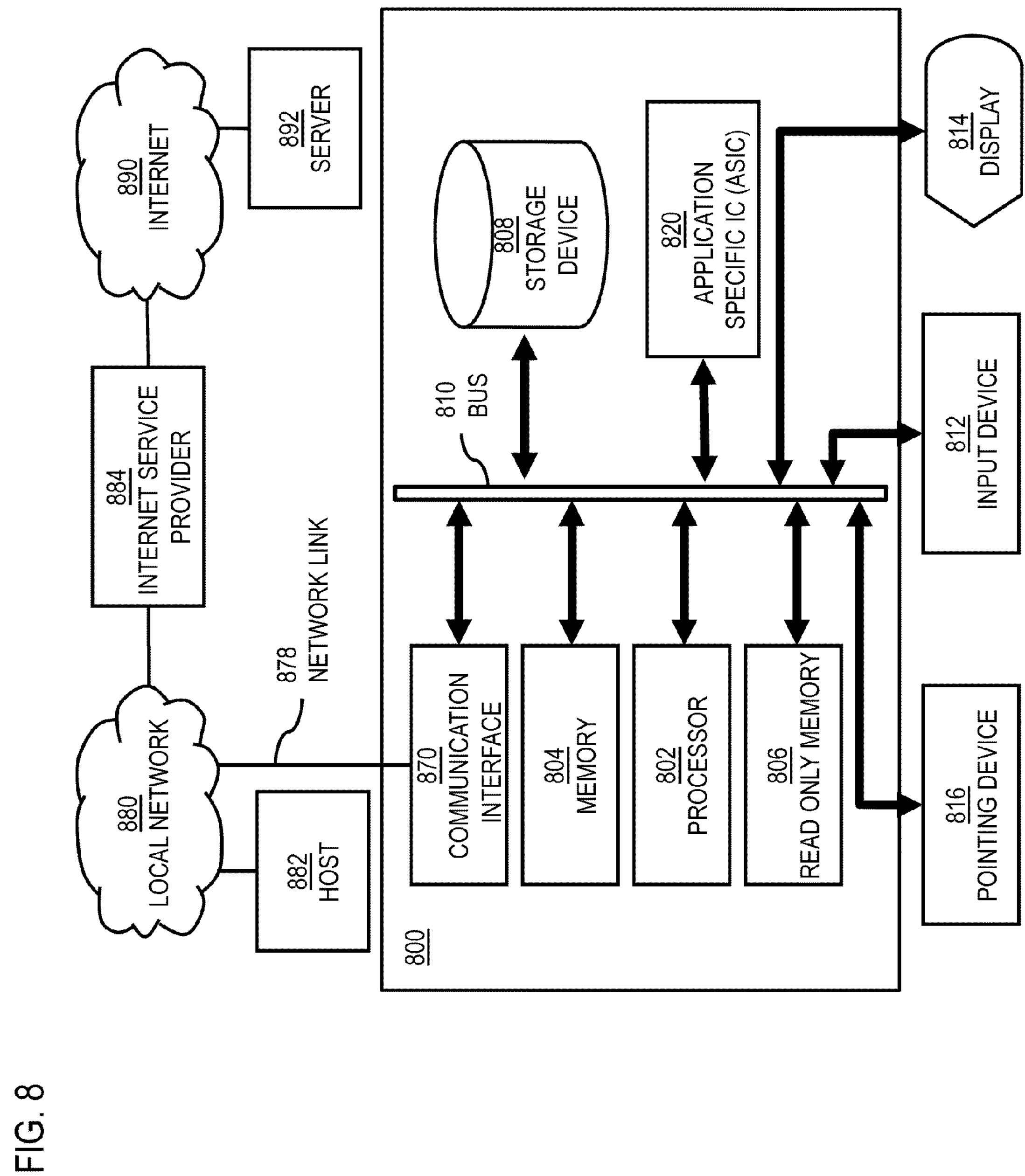
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to notify a user while he or she is driving of an unmapped crossing to prevent the user from unintentionally obstructing access to the crossing as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of notifying a user while he or she is driving of an unmapped crossing to prevent the user from unintentionally obstructing access to the crossing.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to notify a user while he or she is driving of an unmapped crossing to prevent the user from unintentionally obstructing access to the crossing. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for notifying a user while he or she is driving of an unmapped crossing to prevent the user from unintentionally obstructing access to the crossing. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for notifying a user while he or she is driving of an unmapped crossing to prevent the user from unintentionally obstructing access to the crossing, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for notifying a user while he or she is driving of an unmapped crossing to prevent the user from unintentionally obstructing access to the crossing to the UEs 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to notify a user while he or she is driving of an unmapped crossing to prevent the user from unintentionally obstructing access to the crossing as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of notifying a user while he or she is driving of an unmapped crossing to prevent the user from unintentionally obstructing access to the crossing.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to notify a user while he or she is driving of an unmapped crossing to prevent the user from unintentionally obstructing access to the crossing. The memory 905 also stores the data associated with or generated by the execution of the inventive steps.

Figure 10:
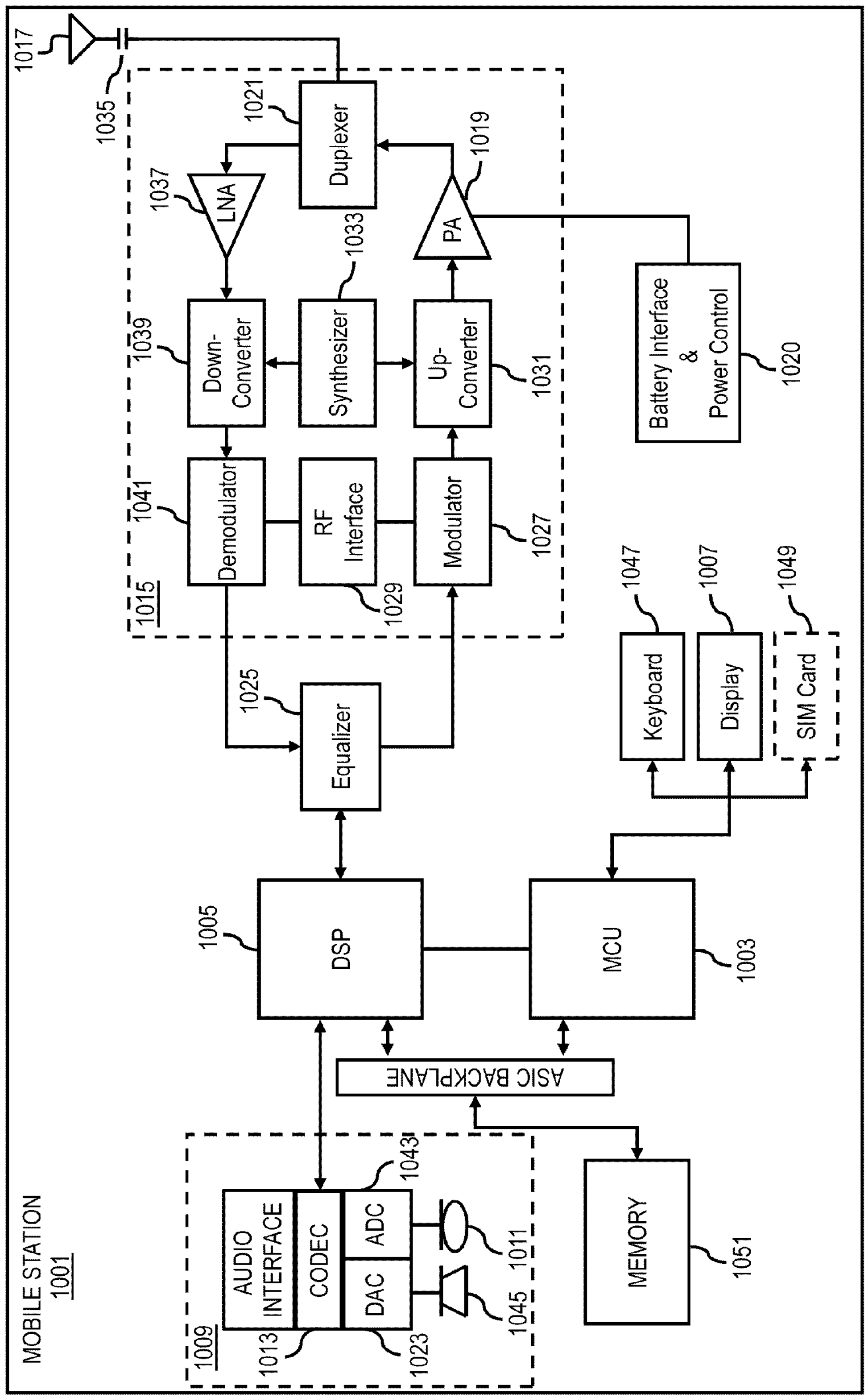
FIG. 10 is a diagram of a mobile device that can be used to implement an embodiment of the invention.

FIG. 10 is a diagram of exemplary components of a mobile device (e.g., a mobile terminal, a mobile phone, a handset, etc.) for communications, which is capable of operating in the system of FIG. 1, according to one embodiment. In some embodiments, mobile terminal 1001, or a portion thereof, constitutes a means for performing one or more steps of notifying a user while he or she is driving of an unmapped crossing to prevent the user from unintentionally obstructing access to the crossing. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of notifying a user while he or she is driving of an unmapped crossing to prevent the user from unintentionally obstructing access to the crossing. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to notify a user while he or she is driving of an unmapped crossing to prevent the user from unintentionally obstructing access to the crossing. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing, by at least one processor, traffic information stored on a non-transitory medium and at least one signal, wherein the the traffic information and the at least one signal is based, at least in part, on the following:

retrieving the traffic information associated with at least one crossing to determine one or more traffic conditions, wherein the traffic information stored on the non-transitory medium includes street maps and traffic patterns based upon historic information;

determining one or more traffic conditions may at least potentially cause at least one obstruction of at least one other crossing by at least one vehicle;

receiving the at least one signal, wherein the at least one signal includes an indication of the current lighting conditions; and presenting at least one notification regarding the at least one obstruction to at least one device associated with the at least one vehicle, at least one other vehicle that is potentially affected by the at least one obstruction, or a combination thereof based, at least in part, on the one or more traffic conditions and based at least in part upon the indication of the lighting condition, wherein the at least one notification will be presented earlier if the lightning conditions indicate poor visibility.

2. A method of claim 1, wherein the at least one crossing, the at least one other crossing, or a combination thereof is an unmapped vehicular crossing.

3. A method of claim 1, wherein the traffic conditions are further based, at least in part, on the following:

a generation of one or more navigation instructions to cause a prevention of the at least one obstruction, wherein the at least one notification includes, at least in part, the one or more navigation instructions.

4. A method of claim 3, wherein the one or more navigation instructions include, at least in part, at least one recommendation of an alternative speed, an alternative spacing, an alternative location, or a combination thereof for the at least one vehicle, the at least one other vehicle, or a combination thereof.

5. A method of claim 1, wherein the traffic conditions are further based, at least in part, on the following:

at least one determination that one or more vehicles are stuck ahead of the at least one crossing, attempting to turn into the at least one other crossing, or a combination thereof.

6. A method of claim 1, wherein the at least one notification is further based, at least in part, on the following:

at least one modification of the presentation of the at least one notification based, at least in part, on the one or more traffic conditions, one or more contexts, or a combination thereof.

7. A method of claim 1, wherein the traffic information is further based, at least in part, on the following:

a processing of historical information, statistical information, vehicle location information, time information, or a combination thereof to determine the traffic information.

8. A method of claim 1, wherein the traffic conditions and the at least one signal are further based, at least in part, on the following:

a processing of sensor information associated with the one or more vehicles, the at least one vehicle, the at least one other vehicle, or a combination thereof to determine the traffic information.

9. A method of claim 1, wherein the traffic conditions are further based, at least in part, on the following:

at least one visual depiction of the at least one crossing, the at least one other crossing, or a combination thereof on the at least one device in connection with the at least one notification.

10. A method of claim 1, wherein the traffic conditions are further based, at least in part, on the following:

a processing of status information associated with one or more traffic lights proximate to the at least one crossing, the at least one other crossing, or a combination, wherein the traffic information is further based, at least in part, on the status information.

11. An apparatus comprising:

at least one processor; and at least one memory including computer program code for one or more programs, the at least one memory and the computer program code configured to, with the at least one processor, cause the apparatus to perform at least the following, process traffic information stored on a non-transitory medium associated with at least one crossing to determine one or more traffic conditions, wherein the traffic information stored on the non-transitory medium includes street maps and traffic patterns based upon historic information;

determine that the one or more traffic conditions may at least potentially cause at least one obstruction of at least one other crossing by at least one vehicle;

receive at least one signal, wherein the at least one signal includes an indication of the current lighting conditions; and cause, at least in part, a presentation of at least one notification regarding the at least one obstruction to at least one device associated with the at least one vehicle, at least one other vehicle that is potentially affected by the at least one obstruction, or a combination thereof based, at least in part, on the one or more traffic conditions, and based at least in part on the indication of the lighting condition, wherein the at least one notification will be presented earlier if the lightning conditions indicate poor visibility.

12. An apparatus of claim 11, wherein the at least one crossing, the at least one other crossing, or a combination thereof is an unmapped vehicular crossing.

13. An apparatus of claim 11, wherein the apparatus is further caused to:

cause, at least in part, a generation of one or more navigation instructions to cause a prevention of the at least one obstruction, wherein the at least one notification includes, at least in part, the one or more navigation instructions.

14. An apparatus of claim 13, wherein the one or more navigation instructions include, at least in part, at least one recommendation of an alternative speed, an alternative spacing, an alternative location, or a combination thereof for the at least one vehicle, the at least one other vehicle, or a combination thereof.

15. An apparatus of claim 11, wherein the apparatus is further caused to:

determine that one or more vehicles are stuck ahead of the at least one crossing, attempting to turn into the at least one other crossing, or a combination thereof, wherein the traffic conditions are further based, at least in part, on the one or more vehicles.

16. An apparatus of claim 11, wherein the apparatus is further caused to:

cause, at least in part, at least one modification of the presentation of the at least one notification based, at least in part, on the one or more traffic conditions, one or more contexts, or a combination thereof.

17. An apparatus of claim 11, wherein the apparatus is further caused to:

process historical information, statistical information, vehicle location information, time information, or a combination thereof to determine the traffic information.

18. An apparatus of claim 11, wherein the apparatus is further caused to:

process sensor information associated with the one or more vehicles, the at least one vehicle, the at least one other vehicle, or a combination thereof to determine the traffic information.

19. An apparatus of claim 11, wherein the apparatus is further caused to:

cause, at least in part, at least one visual depiction of the at least one crossing, the at least one other crossing, or a combination thereof on the at least one device in connection with the at least one notification.

20. An apparatus of claim 11, wherein the apparatus is further caused to:

process status information associated with one or more traffic lights proximate to the at least one crossing, the at least one other crossing, or a combination, wherein the traffic information is further based, at least in part, on the status information.

* * * * *